(12) United States Patent
Benner et al.

(10) Patent No.: US 9,402,272 B2
(45) Date of Patent: Jul. 26, 2016

(54) ELECTRONIC DEVICE HAVING A CELLULAR COMMUNICATION MODE AND A RADIO COMMUNICATION MODE

(75) Inventors: Jens Benner, København (DK); Povl Koch, København (DK); Jian Ma, Beijing (CN); Seppo Hamalainen, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1207 days.

(21) Appl. No.: 11/885,291

(22) PCT Filed: Mar. 17, 2005

(86) PCT No.: PCT/IB2005/000925
§ 371 (c)(1),
(2), (4) Date: Apr. 21, 2008

(87) PCT Pub. No.: WO2006/097783
PCT Pub. Date: Sep. 21, 2006

(65) Prior Publication Data
US 2009/0098906 A1      Apr. 16, 2009

(51) Int. Cl.
| | | |
|---|---|---|
| H04W 76/02 | (2009.01) |
| H04W 12/02 | (2009.01) |
| H04W 84/04 | (2009.01) |
| H04W 84/18 | (2009.01) |
| H04W 88/06 | (2009.01) |

(52) U.S. Cl.
CPC ............ H04W 76/025 (2013.01); H04W 12/02 (2013.01); H04W 84/042 (2013.01); H04W 84/18 (2013.01); H04W 88/06 (2013.01)

(58) Field of Classification Search
CPC . H04W 76/023; H04W 76/025; H04W 12/02; H04W 88/06; H04W 84/18; H04W 84/042
USPC .................... 455/41.2, 550.1, 553.1
See application file for complete search history.

(56) References Cited

U.S. PATENT DOCUMENTS

| | | | |
|---|---|---|---|
| 6,658,264 | B1 | 12/2003 | Irvin ........................... 455/552.1 |
| 7,116,975 | B1 * | 10/2006 | Link et al. ...................... 455/417 |
| 7,277,724 | B2 * | 10/2007 | Jones et al. ................. 455/553.1 |
| 8,019,381 | B2 * | 9/2011 | Mauney et al. ............ 455/552.1 |
| 2001/0006889 | A1 * | 7/2001 | Kraft ............................. 455/412 |

(Continued)

FOREIGN PATENT DOCUMENTS

| | | |
|---|---|---|
| DE | 197 04 907 A1 | 7/1997 |
| EP | 1 324 550 A2 | 7/2003 |
| EP | 1 455 486 A1 | 9/2004 |

OTHER PUBLICATIONS

"Push to Talk", www. Nokia.com, 1 pg.

(Continued)

*Primary Examiner* — Nathan Mitchell
(74) *Attorney, Agent, or Firm* — Core Wireless Licensing Ltd.

(57) ABSTRACT

An electronic device having a cellular communication mode and a radio communication mode, the electronic device including first transceiver means, operable in the cellular communication mode, for transmitting a message via a cellular network, the message including information for enabling a radio communication mode of a further electronic device; and second transceiver means, operable in the radio communication mode, for communicating with the further electronic device when in the radio communication mode.

2 Claims, 6 Drawing Sheets

(56) References Cited

U.S. PATENT DOCUMENTS

| | | | |
|---|---|---|---|
| 2001/0019956 A1* | 9/2001 | Tada | 455/434 |
| 2002/0052754 A1* | 5/2002 | Joyce et al. | 705/1 |
| 2002/0061755 A1* | 5/2002 | Nohara et al. | 455/457 |
| 2003/0125074 A1* | 7/2003 | Tanada et al. | 455/552 |
| 2003/0212802 A1* | 11/2003 | Rector et al. | 709/228 |
| 2004/0090944 A1* | 5/2004 | Ueno | 370/338 |
| 2004/0204097 A1* | 10/2004 | Scheinert et al. | 455/561 |
| 2004/0224704 A1* | 11/2004 | Islam et al. | 455/466 |
| 2006/0046653 A1* | 3/2006 | Kirbas | 455/41.2 |
| 2007/0037517 A1* | 2/2007 | Camuffo et al. | 455/41.2 |

OTHER PUBLICATIONS

"Push to Talk over Cellular", Siemens Mobile, © Siemens AG 2004, 15 pgs.

* cited by examiner

ELECTRONIC DEVICE HAVING A CELLULAR COMMUNICATION MODE AND A RADIO COMMUNICATION MODE

FIELD OF THE INVENTION

Embodiments of the present invention relate to an electronic device having a cellular communication mode and a radio communication mode.

BACKGROUND TO THE INVENTION

Currently, people use cellular telephones for conducting conversations with other people and for sending other information such as SMS messages, audio and video data to other cellular telephones. Cellular telephones operate by connecting to a cellular network and by transmitting and receiving radio signals having frequencies within licensed frequency bands via the cellular network. User's of cellular telephones usually subscribe to a cellular network and/or pay for communicating across the cellular network. Consequently, it can be expensive to communicate using a cellular telephone.

Recently, there has been a drive to add extra features to cellular telephones to make them more attractive to consumers. One such feature is Push to Talk over Cellular (PoC). This feature enables a person to select one or more contacts in their address book that they wish to broadcast a voice message to, press a single button and then transmit the voice message to the selected contacts via the cellular network. One disadvantage of Push to Talk over Cellular is that it uses the cellular network to broadcast the voice message. As mentioned above, this may cost the user money and may deter them from using the feature.

Alternatively, a Walkie-talkie may be used to conduct a conversation since it is arranged to transmit and receive radio broadcast signals which have frequencies in the unlicensed radio bands. Although Walkie-talkies are free to operate, they have limited broadcasting range (typical less than 10 km) and consume battery power because it is necessary to have them always turned on if you wish to receive a communication. A further disadvantage with Walkie-talkies is that people who are late joining the conversation have no way of knowing the correct frequency band to tune to.

Therefore, it is desirable to provide an alternative electronic device for communication.

BRIEF DESCRIPTION OF THE INVENTION

According to one embodiment of the invention there is provided an electronic device having a cellular communication mode and a radio communication mode, the electronic device comprising: first transceiver means, operable in the cellular communication mode, for transmitting a message via a cellular network, the message including information for enabling a radio communication mode of a further electronic device; and second transceiver means, operable in the radio communication mode, for communicating with the further electronic device when in the radio communication mode.

The information may include activation data for activating the radio communication mode of the further electronic device. The activation data may be for automatically activating the radio communication mode of the further electronic device.

The information may include data for securing radio communications between the electronic device operating in the radio communication mode and the further electronic device operating in the radio communication mode. The data for securing radio communications may an encryption key. The encryption key may include a private key and a public key. Alternatively, the encryption key may include personal identification number (PIN) data.

The information may include data which defines a channel. The electronic device may comprise a controller for determining the channel and providing it, as data within the message, to the first transceiver means.

The controller may determine the channel by selecting a free channel.

The electronic device may comprise a memory including a data structure. The data structure may comprise country identification data and associated channel data, and wherein the controller may determine the channel using the data structure.

The controller may be operable to use country identification data obtained from the cellular communication mode, to its associated channel data from the data structure. If a channel of the cellular mode changes a plurality of times over a threshold plurality of times, within a predetermined time, a user of the electronic device may be requested to input country identification data.

The radio communication mode of the electronic device may be disabled until the user has provided the country identification data.

The electronic device may comprise an electronic data card. The electronic data card may include country identification data, and wherein the controller is operable to use the country identification data obtained from the electronic data card to determine its associated channel data from the data structure.

The country identification data and/or the channel data of the data structure may be remotely modifiable.

The functionality of the radio communication mode may be dependent upon a subscription for the cellular communication mode. The functionality of the radio communication mode may be dependent upon a subscription for the radio communication mode.

The functionality of the radio communication mode may be dependent upon the functionality of the cellular communication mode. The radio communication mode may be disabled when the cellular communication mode is disabled. The power of the second transceiver means may be dependent upon the functionality of the cellular communication mode. The information of the message may be dependent upon the functionality of the cellular communication mode.

According to another embodiment of the present invention there is provided an electronic device having a cellular communication mode and a radio communication mode, the electronic device comprising: first transceiver means, operable in the cellular communication mode, for receiving a message via a cellular network, the message including information for enabling the radio communication mode of the electronic device; and second transceiver means, operable in the radio communication mode, for communicating with a further electronic device when in the radio communication mode.

The first transceiver means may transmit a receipt message to the further electronic device when the message has been received.

According to a further embodiment of the present invention there is provided a cellular network comprising: a receiver for receiving a message from a first electronic device; and means for routing the message to a second electronic device having a cellular communication mode and a radio communication mode, wherein the message includes information for enabling the radio communication mode of the second electronic device.

According to another embodiment of the present invention there is provided a method for enabling, via a cellular network, radio communication outside the cellular network between a first electronic device and another electronic device, the method comprising: presenting to a user of the first electronic device, a selectable option for activating a radio communication mode in which the user is capable of communicating, outside the cellular network, with a user of another electronic device; presenting to the user of the first electronic device, a plurality of destinations for selection by the user of the first electronic device; and sending a message to at least one selected destination via the cellular network, wherein the message includes information for enabling the radio communication mode of a second electronic device associated with the selected destination.

According to a further embodiment of the present invention there is provided a method for enabling, via a cellular network, radio communication outside the cellular network between a first electronic device and another electronic device, the method comprising: receiving a message, via the cellular network, at the first electronic device; wherein the message includes information for enabling a radio communication mode of the first electronic device in which the user is capable of communicating, outside the cellular network, with a user of another electronic device; and presenting to a user of the first electronic device, a selectable option for activating the radio communication mode using the information included in the received message.

According to another embodiment of the present invention there is provided a computer program comprising program instructions which, when loaded into a controller of a host electronic device, having a cellular communication mode and a radio communication mode, enable the controller to activate the radio communication mode of the host electronic device and enable the controller to form a message for transmission by the host electronic device when in the cellular communication mode, the message including information for enabling a radio communication mode of a remote electronic device.

According to a further embodiment of the present invention there is provided a computer program comprising program instructions for enabling, via a cellular network, radio communication outside of the cellular network between a first host electronic device and another electronic device, and comprising: means for controlling a transceiver to send a message from the first host electronic device to a user-selected destination via the cellular network, wherein the message includes information for enabling the radio communication mode of a second electronic device associated with the selected destination.

According to another embodiment of the present invention there is provided a computer program comprising program instructions for enabling, via a cellular network, radio communication outside of the cellular network between a first host electronic device and another electronic device, and comprising: means for determining the receipt of a message, via the cellular network, at the first host electronic device; wherein the message includes information for enabling a radio communication mode of the first host electronic device in which the user is capable of communicating, outside the cellular network, with a user of another electronic device; and means for controlling a display to present to a user of the first host electronic device, a selectable option for activating the radio communication mode using the information included in the received message.

According to a further embodiment of the present invention there is provided a physical entity embodying the computer program as described in the preceding paragraphs.

According to another embodiment of the present invention there is provided an electromagnetic carrier signal carrying the computer program as described in the preceding paragraphs.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
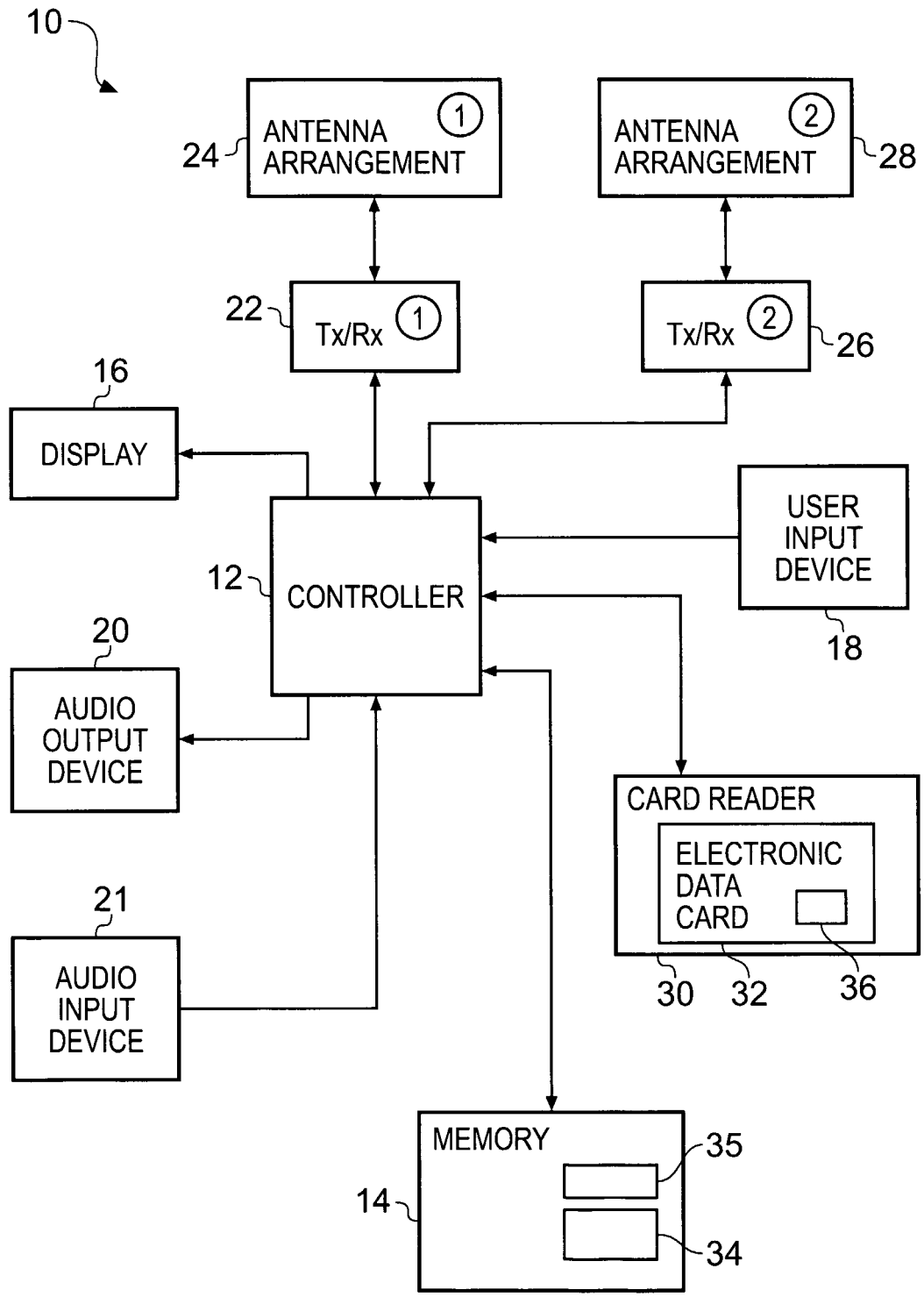
FIG. 1 illustrates a schematic diagram of one embodiment of an electronic device.
Figure 2:
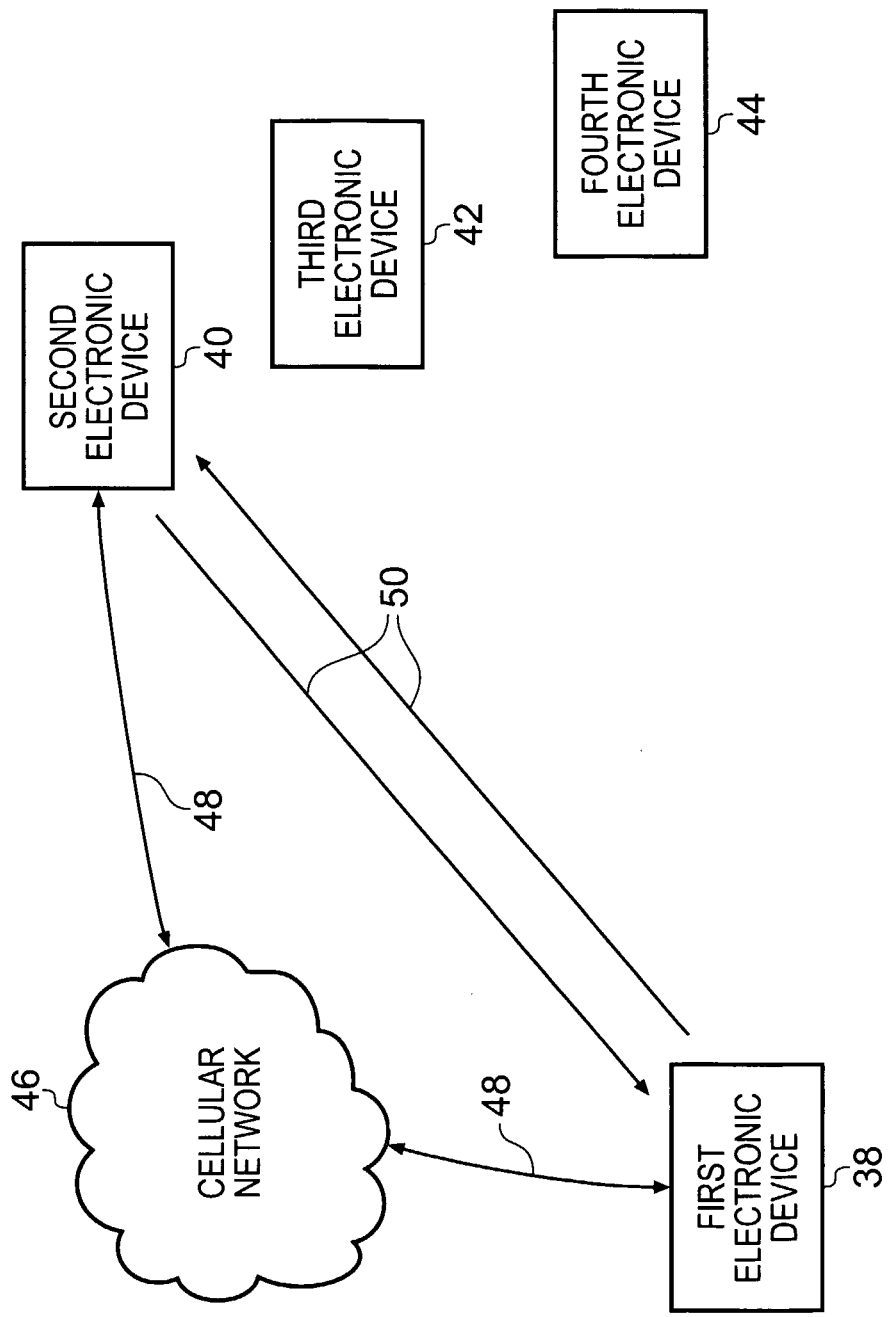
FIG. 2 illustrates a schematic diagram of a plurality of electronic devices.
Figure 5:
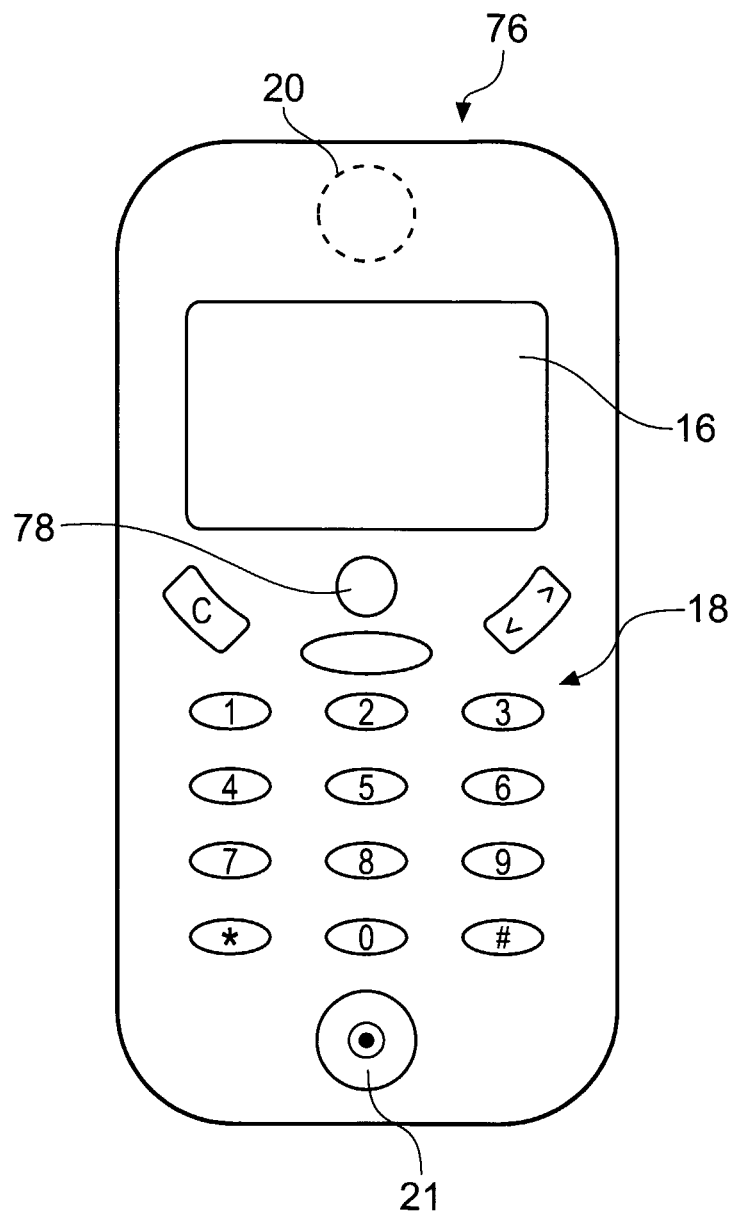
FIG. 5 illustrates a front view of one embodiment of an electronic device.

FIGS. 1, 2 and 5 illustrate an electronic device 10 having a cellular communication mode and a radio communication mode, the electronic device 10 comprising: first transceiver means 22, operable in the cellular communication mode, for transmitting a message via a cellular network 46, the message including information for enabling a radio communication mode of a further electronic device; and second transceiver means 26, operable in the radio communication mode, for communicating with the further electronic device when in the radio communication mode.

FIG. 1 illustrates a schematic diagram of one embodiment of an electronic device 10. In more detail, the electronic device 10 comprises a controller 12, a memory 14, a display 16, a user input device 18, an audio output device 20, an audio input device 21, a first transceiver 22, a first antenna arrangement 24, a second transceiver 26, a second antenna arrangement 28 and a card reader 30 including an electronic data card 32.

The electronic device 10 may be any device that is arranged to communicate via a cellular network. The electronic device 10 has two operable modes, a cellular communication mode and a radio communication mode. The electronic device 10 may operate in the cellular communication mode or the radio communication mode or may operate in the cellular communication mode and the radio communication mode at the same time. The electronic device 10 may be a portable telephone, such as a mobile cellular telephone. Alternatively, the electronic device 10 may be a personal digital assistant (PDA), a laptop computer or a personal computer. In this embodiment, the electronic device 10 is a mobile cellular telephone.

The controller 12 may be any suitable processor and is, in this embodiment, a microprocessor. The controller 12 is connected to read from and write to the memory 14. The memory 14 may be any suitable memory and may, for example be permanent built-in memory such as flash memory or it may be a removable memory such as a hard disk, secure digital (SD) card or a micro-drive.

The display 16 is coupled to the controller 12 for receiving and displaying data. The controller 12 may read data from the memory 14 and provide it to the display 16 for display to a user of the cellular telephone 10. The controller 12 may also be arranged to control a graphical user interface displayed on the display 16. The display 16 may be any suitable display and may be for example, a thin film transistor (TFT) display, a liquid crystal display (LCD), a monitor or a television.

The user input device 18 is operable by a user to provide control signals to the controller 12. The user may control the user input device 18 to input data to the electronic device 10 or to control a cursor displayed on a graphical user interface of the display 16 of the electronic device 10. The user input device 18 may be a keypad, a keyboard, a mouse, a trackball, a touch pad, a trackpoint or any other suitable user input device.

The controller 12 is arranged to provide audio data to the audio output device 20. The audio output device 20 is arranged to convert the audio data into acoustic waves, audible to the user of the cellular telephone 10. The audio output device 20 may be, for example, a loudspeaker.

The audio input device 21 is arranged to convert acoustic waves (for example, a voice of a user) into an electrical signal for input to the controller 12. The audio input device 21 is, in this embodiment, a microphone.

The first transceiver 22 is connected to the first antenna arrangement 24 and to the controller 12. The first transceiver 22 and the first antenna arrangement 24 are operable when the electronic device 10 is in a cellular communication mode. The controller 12 is arranged to provide data to the first transceiver 22. The first transceiver 22 is arranged to encode the data and provide it to the first antenna arrangement 24 for transmission. The first antenna arrangement 24 is arranged to transmit the encoded data as a radio signal to a further electronic device via a cellular network 46.

The first antenna arrangement 24 is also arranged to receive a radio signal from a further electronic device via a cellular network. The first antenna arrangement 24 then provides the received radio signal to the first transceiver 22 which decodes the radio signal into data. The first transceiver 22 then provides the data to the controller 12. The radio signal has a frequency within a licensed cellular frequency band (for example, within a GSM frequency band (e.g. 900 MHz)).

The second transceiver 26 is connected to the second antenna arrangement 28 and to the controller 12. The second transceiver 26 and the second antenna arrangement 28 are operable when the cellular telephone 10 is in the radio communication mode. The controller 12 is arranged to provide data to the second transceiver 26. The second transceiver 26 is arranged to encode the data and provide the decoded data to the second antenna arrangement 28 for transmission. The second antenna arrangement 28 is arranged to transmit the data as a radio signal, not via the cellular network, to a further electronic device.

The second antenna arrangement 28 is also arranged to receive a radio signal from a further electronic device, not via the cellular network, and provide it to the second transceiver 26. The second transceiver 26 is arranged to decode the radio signal into data and provide the data to the controller 12. The radio signal has a frequency within an unlicensed frequency band (for example, within the unlicensed walkie-talkie bands). One example of an unlicensed frequency band is the Family Radio Service (462-476 KHz) in the US, Canada and Brazil. Another example, of an unlicensed frequency band is the Private Mobile Radio service (446 MHz) in Europe.

The controller 12 is electrically coupled to control the card reader 30 to read from and write to the electronic data card 32. The electronic data card 32 may be any electronic data card and is, in this embodiment, a subscriber identity module (SIM) card. The SIM card 32 includes, in this embodiment, country identification data 36 that defines the home country.

In this embodiment, the memory 14 includes a data structure 34 that includes country identification data and associated channel data. The data structure 34 will be discussed in greater detail in the following paragraphs with reference to FIG. 6.

The memory 14 stores computer program instructions 35 that control the operation of the electronic device 10 when loaded into the controller 12. The computer program instructions 35 provide the logic and routines that enables the host electronic device to perform the methods illustrated in FIGS. 3 and 4.

The computer program instructions may, for example, arrive at the electronic device 10 via an electromagnetic carrier signal. For example, the electromagnetic carrier signal may be sent via the internet from an internet server or may be sent via a wireless link. The computer program instructions may be copied from a physical entity such as a storage device, a computer program product, a memory device or a computer readable record medium such as a CD-ROM or DVD. These physical entities may be portable and brought to the electronic device 10 for the transfer of the computer program instructions 35 to memory 14 or may be remotely located and the computer program instructions 35 may be transferred via a network such as the internet to the electronic device 10.

FIG. 2 illustrates a schematic diagram of a plurality of electronic devices. In more detail, FIG. 2 illustrates a first electronic device 38, a second electronic device 40, a third electronic device 42 and a fourth electronic device 44. The electronic devices 38, 40, 42 and 44 are similar to the electronic device 10 illustrated in FIG. 1 and comprise the same or similar features. The electronic devices 38, 40, 42 and 44 are each operable in the cellular communication mode and the radio communication mode.

The first electronic device 38 is operable in the cellular communication mode to transmit data to and receive data from (as indicated by arrows 48) the second electronic device 40 when it is in the cellular communication network via a cellular network 46. The cellular network 46 may be any suitable cellular network and may be, for example, GSM, CDMA, WCDMA or PHS.

In this embodiment, the first electronic device 38 is operable in the radio communication mode to directly transmit data to and directly receive data from (as indicated by arrows 50) the second electronic device 40 when it is in the radio communication mode. This communication is direct and not via the cellular network 46. In other embodiments, the first electronic device 38 is operable in the radio communication mode to transmit data to and receive data from the second electronic device via a network (not illustrated) which is different to the cellular network 46. For example, the network may be a Bluetooth Piconet.

It should be understood that the arrows 48 and 50 have been illustrated only between the first electronic device 38 and the second electronic device 40 for clarity purposes. The arrows 48 and 50 may extend between any combination of the electronic devices 38, 40, 42 and 44 and may extend from one electronic device to a plurality of electronic devices. For example, the first electronic device 38 may transmit the same data to the second electronic device 40, the third electronic device 42 and the fourth electronic device 44.

Figure 3:
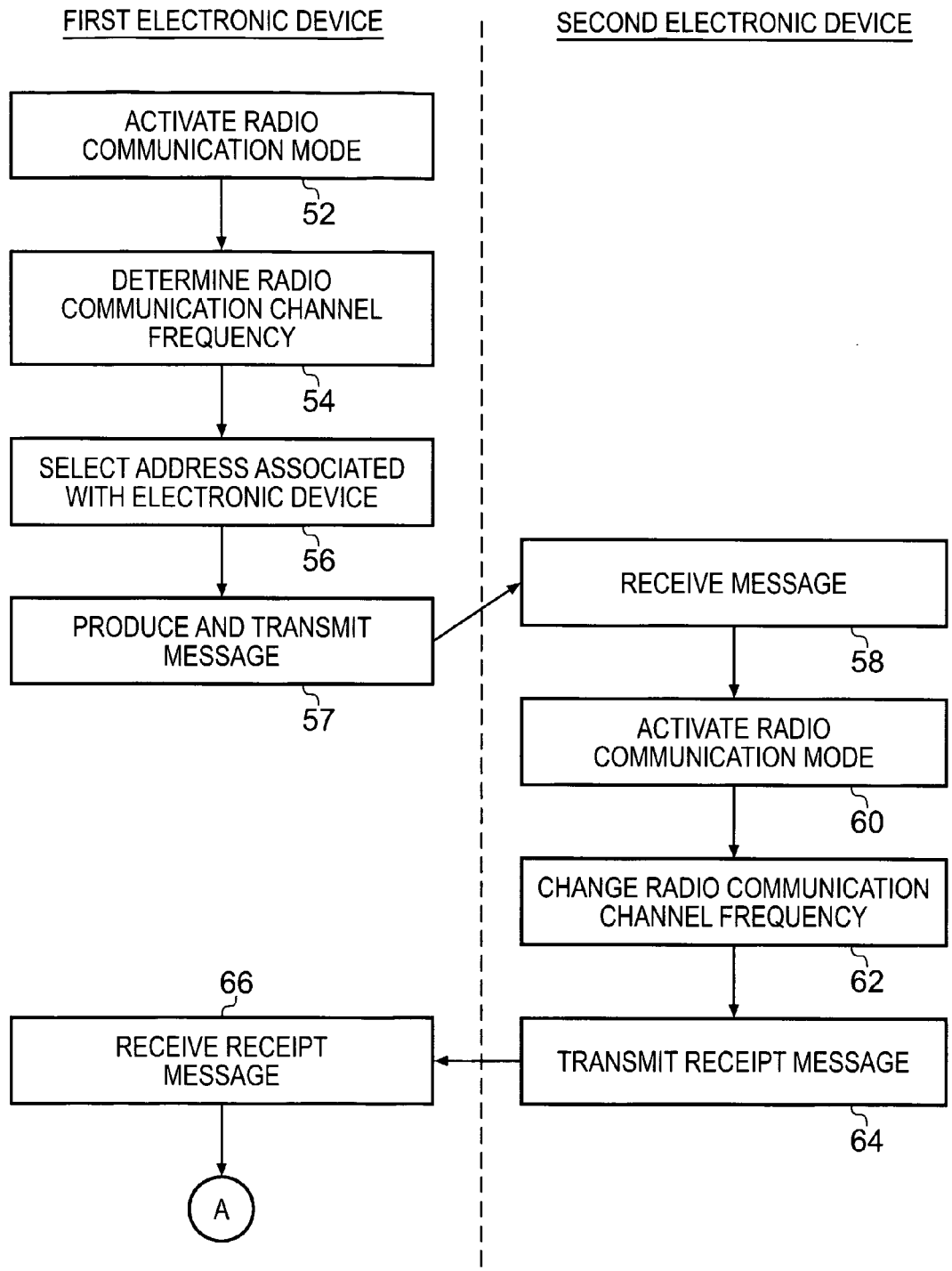
FIG. 3 illustrates a flow diagram of one embodiment of the activation of the radio communication mode of an electronic device.

FIG. 3 illustrates a flow diagram that outlines the steps for activating radio communication, outside the cellular network 46, between the first electronic device 38 and the second electronic device 40 according to one embodiment of the invention. The steps illustrated in FIG. 3 will be explained with reference to FIGS. 1 and 2.

In step 52, a user provides an input to the user input device 18 of the first electronic device 38 to activate the radio communication mode of the first electronic device 38. In one embodiment, the user is presented with (via a graphical user interface displayed on the display 16) a selectable option for activating the radio communication mode. In another embodiment, the radio communication mode is activated by actuation of a dedicated button of the user input device 18 by the user.

In step 54, the controller 12 determines a channel for communication for the radio communication mode. The controller 12 may also determine data for securing communications between the first electronic device 38 when in the radio communication mode and the second electronic device 40 when in the radio communication mode. The determination of the channel and of the data for securing communications will be discussed in greater detail in the following paragraphs.

In step 56, the display 16 presents a plurality of selectable destinations, each of which is associated with one of the electronic devices 40, 42 and 44. In this embodiment, the user provides an input to the user input device 18 to select the destination associated with the second electronic device 40.

In step 57, the controller 12 produces a message which includes information for enabling the radio communication mode of the second electronic device 40. In this embodiment, the message is an SMS message and the information includes activation data for activating the radio communication mode of the second electronic device 40. The information also includes data which defines the channel and the data for securing communications, both of which were determined by the controller 12 in step 54.

The message is decoded in the first transceiver 22 and then provided to the first antenna arrangement 24. The message is transmitted as a radio signal from the first antenna arrangement 24 to the second electronic device 40 via the cellular network 46.

In step 58, the second electronic device 40 receives the message. The message is received by the first antenna arrangement 24 of the second electronic device 40 and is decoded into data by the first transceiver 22. The decoded data is then provided to the controller 12.

In step 60, the controller 12 uses the activation data in the received message to automatically activate the radio communication mode of the second electronic device 40. A user of the second electronic device 40 may be alerted to the activation of the radio communication mode by an audible alarm provided by the audio output device 18 or by a visual alarm provided by the display 16. In another embodiment, the user may be alerted to the reception of the message and requested, via a selectable option displayed on the display 16, to provide an input (via the user input device 18) to determine whether the radio communication mode is activated or not.

In step 62, the controller 12 uses the channel data in the received message to change the channel frequency of the second transceiver 26. Consequently, the first electronic device 38 and the second electronic device 40 both communicate, when in the radio communication mode, on the same channel.

In one embodiment, the second electronic device 40 transmits a receipt message, via the cellular network 46, to the first electronic device 38, to acknowledge receipt of the message sent by the first electronic device 38 (step 64). The first electronic device 38 receives the receipt message (step 66) and the display 16 and/or the audio output device 20 provide an alert to the user of the first electronic device 38 to the fact that the radio communication mode of the second electronic device 40 has been activated.

Figure 4:
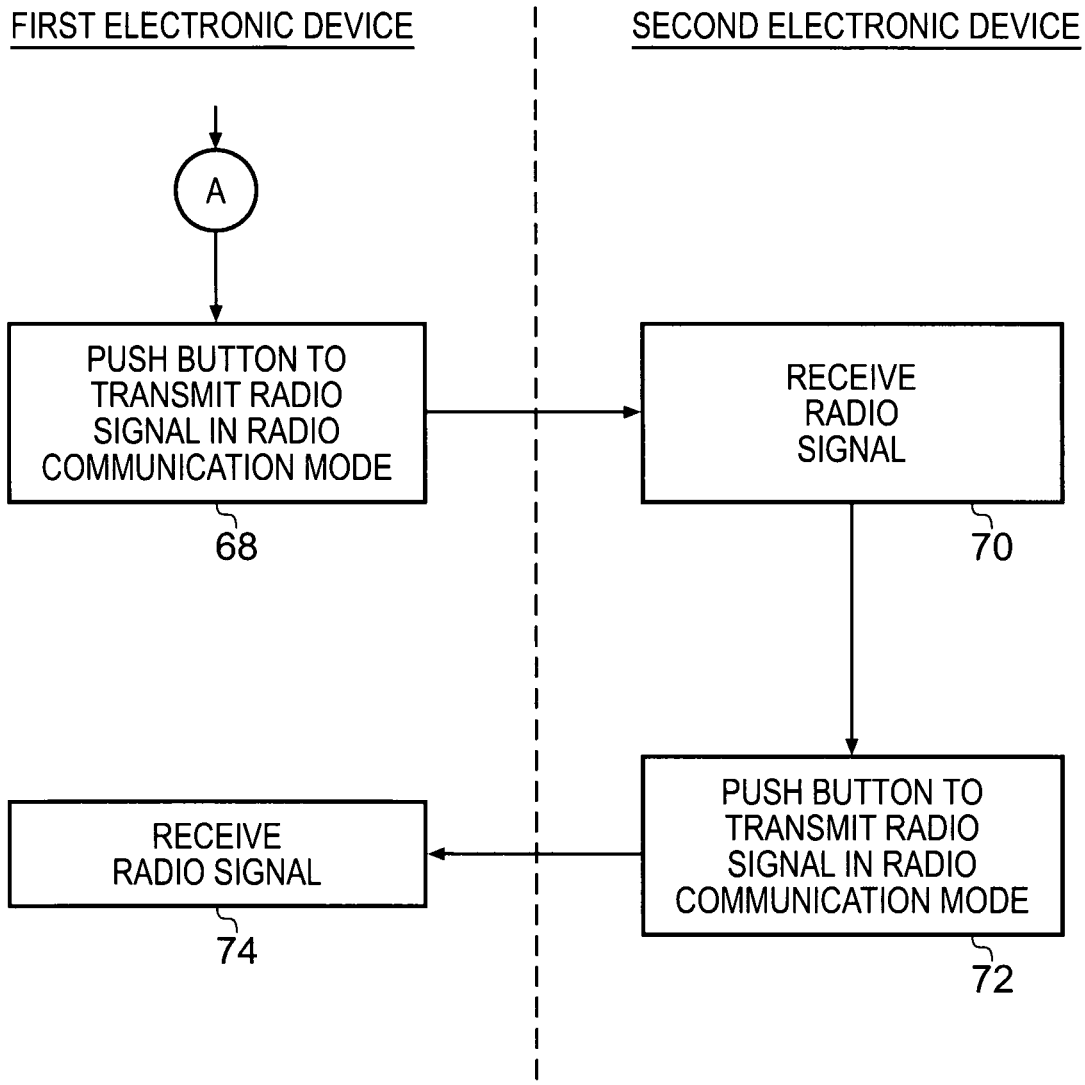
FIG. 4 illustrates a flow diagram of one embodiment of communication between two electronic devices when in the radio communication mode.

FIG. 4 illustrates a flow diagram of communication between the first electronic device 38 when in the radio communication mode and the second electronic device 40 when in the radio communication mode. The flow diagram illustrated in FIG. 4 may be viewed as a continuation of the flow diagram illustrated in FIG. 3.

In step 68, the user of the first electronic device 38 provides an input to the user input device 18 to enable transmission of a radio signal when in the radio communication mode. The user provides an acoustic wave which is converted into an audio signal by the audio input device 21. The controller 12 provides the audio signal to the second antenna arrangement 28 which then transmits it as a radio signal to the second electronic device 40.

In step 70, the second electronic device 40 receives the radio signal at the second antenna arrangement 28 which is then provided to the audio output device 20. The audio output device 20 recreates the acoustic wave produced by the user of the first electronic device 38 for the user of the second electronic device 40.

In step 72, the user of the second electronic device 40 provides an input to the user input device 18 to enable transmission of a radio signal when in the radio communication mode. The user provides an acoustic wave which is converted into an audio signal by the audio input device 21. The controller 12 provides the audio signal to the second antenna arrangement 28 which then transmits it as a radio signal to the first electronic device 38.

In step 74, the first electronic device 38 receives the radio signal at the second antenna arrangement 28 which is then provided to the audio output device 20. The audio output device 20 recreates the acoustic wave produced by the user of the second electronic device 40 for the user of the first electronic device 40.

Consequently, the user of the first electronic device 38 and the user of the second electronic device 40 are able to communicate by transmitting radio signals which are not sent via the cellular network 46. The cellular network 46 is used to enable the radio communication mode of the second electronic device 40 and to therefore initiate communication, outside the cellular network 46, between the first electronic device 38 and the second electronic device 40 when in their radio communication modes.

FIG. 5 illustrates a front view of one embodiment of an electronic device 76. The electronic device 76 is similar to the electronic device 10 illustrated in FIG. 1 and where the features are similar, the same reference numerals have been used.

In this embodiment, a button 78 of the user input device 18 may be actuated by a user of the device 76 to activate the radio communication mode (as mentioned above with reference to step 52 of FIG. 3) and to enable transmission of a radio signal when the electronic device 76 is the radio communication mode. For example, if the user wishes to say something to a user of another electronic device, they have to press and hold down the button 78 while they are talking. In this embodiment, the button 78 enables\disables the audio input device 21. Referring to FIG. 3, in step 54, the controller 12 may determine the channel for the radio communication mode a number of ways.

In one embodiment, the controller 12 determines the channel for the radio communication mode by selecting a free channel, i.e. a channel on which no other electronic devices are communicating on. The controller 12 controls the second transceiver 26 to tune to each channel frequency for a predetermined period of time. If the controller 12 receives a signal from the second transceiver 26, indicating that another electronic device is communicating on that frequency, it checks the next channel frequency for radio signals. If the controller 12 does not receive a signal from the second transceiver 26 within the predetermined period of time at a given channel frequency, the controller 12 selects that channel frequency for communication when in the radio communication mode. An advantage provided by this feature is that it may increase privacy when communicating in the radio communication mode.

Alternatively, the user may select a free channel by manually tuning the second transceiver 26 to different channels and listening for radio signals being broadcast by other electronic devices.

Figure 6:
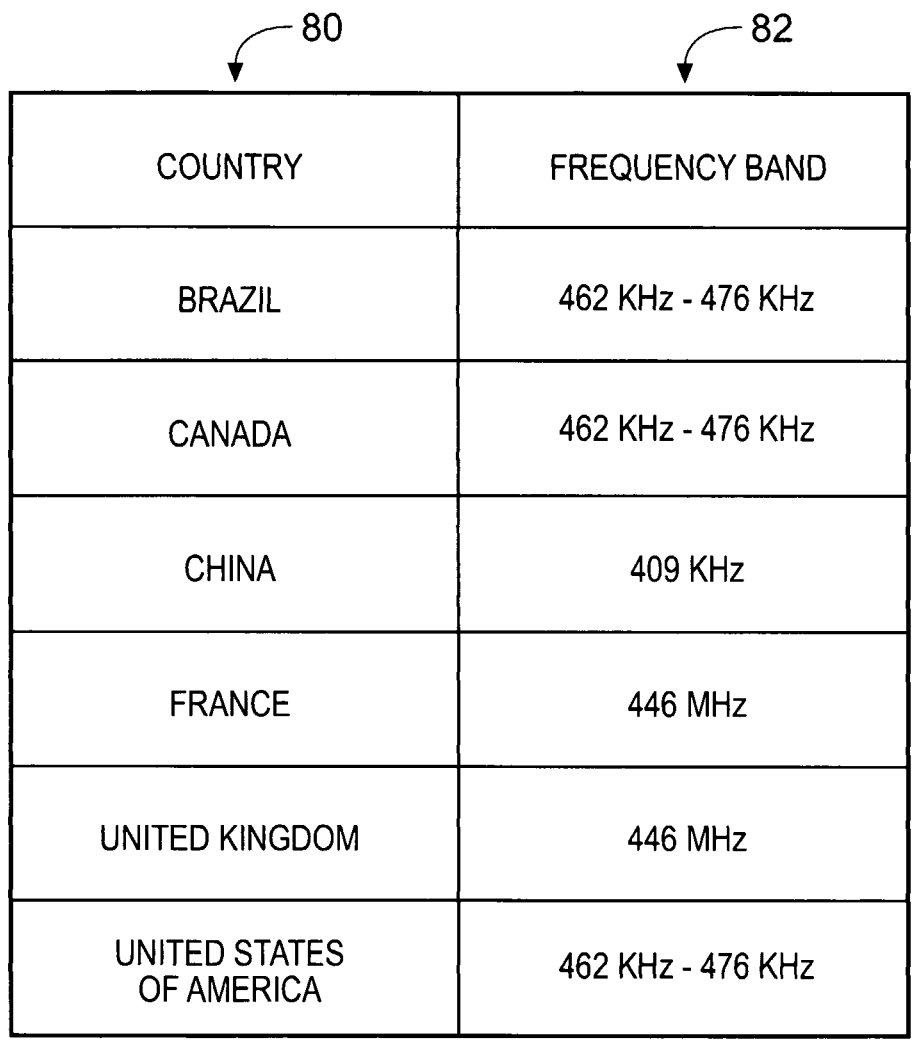
FIG. 6 illustrates a tabular representation of one embodiment of a data structure.

In another embodiment, the controller 12 determines the channel for the radio communication mode by selecting a channel frequency which is suitable for the country in which the electronic device is located. In this embodiment, the data structure 34 stored in the memory 14 is used to provide a channel frequency for a given country. A tabular representation of the data structure is illustrated in FIG. 6. FIG. 6 illustrates a table having two columns. The first column 80 comprises a plurality of countries (provided by the country identification data) and the second column 82 comprises the channel frequency band (provided by the channel data). If the controller 12 has been provided with country identification data, it is able to read out the associated channel data from the data structure 34 and then control the second transceiver 26 to transmit and receive radio signals having that channel frequency. In this embodiment, the data structure 34 is modifiable by a remote server using the SIM application toolkit. The data structure 34 may also be modifiable by the user of the electronic device.

In one embodiment, the controller 12 reads out country identification data 36 from the electronic data card 32. In another embodiment, the controller 12 can obtain country identification data from the cellular network 46. If the user of the electronic device crosses national borders, the cellular network usually changes to that of the new country. If the user is travelling along a border, the cellular network may keep changing from the cellular network of one country to the cellular network of the other country. If the cellular network changes a plurality of times over a threshold plurality of times, within a predetermined time, the controller 12 controls the display 16 to prompt the user to select one of the countries (and thereby provide country identification data). If the user does not select one of the countries, the radio communication mode is deactivated or disabled until the user selects a country.

One advantage provided by this feature is that the user is less likely to use a channel which is currently in use in the country and being used for a different purpose. For example, in some countries, the unlicensed frequency bands of other countries are used by the military or emergency services and if a user transmits a message he may be liable to pay a fine.

If the electronic device does not comprise an electronic data card 32 and the controller 12 is unable to determine country identification data from the cellular communication mode, the display 16 displays a request to the user to select a country (and thereby provide country identification data)

As mentioned above with reference to step 54 of FIG. 3, the controller also determines data for securing communication between the first electronic device 38 when in the radio communication mode and the second electronic device 40 when in the radio communication mode. The data for securing communications may be encryption data comprising a public key and a private key. The private key is used by the controller 12 of an electronic device to encrypt a radio signal being transmitted outside the cellular network (as in steps 68 & 72 of FIG. 4). The receiving electronic device may store the encrypted radio signal in the memory 14 and the controller 12 of the receiving electronic device may use the public key to decrypt the radio signal and then provide it to the audio output device 20 (as in steps 70 & 74 of FIG. 4).

In another embodiment, the data for securing communications comprises personal identification number (PIN) data which is used as an encryption key. This embodiment is one example of symmetric key encryption. In this embodiment, an electronic device receiving a radio signal which was transmitted outside the cellular network temporally stores the radio signal in the memory 14 and the controller 12 of the receiving electronic device requires the PIN data to decrypt the radio signal and provide it to the audio output device 20.

One advantage provided by the data for securing communications is that it may increase the privacy for users when communicating in the radio communication mode. The encryption data which comprises the public key and the private key may provide a further advantage in that the electronic devices may be authenticated by a certificate authority prior to the transmission of the public key.

In one embodiment, the functionality of the radio communication mode is dependent upon a subscription for the cellular communication mode. For example, if a user's subscription to a cellular network has expired, they will be unable to activate the radio communication mode. Additionally, if there is a plurality of subscription types for the cellular communication mode, the functionality of the radio communication mode changes according to the subscription type and cellular communication mode features. For example, if the user has an inexpensive subscription for the cellular communication mode and therefore minimal cellular communication mode features, the radio communication mode will not use the data for securing communications when transmitting a radio signal outside the cellular network. Additionally or alternatively, the transmission power of the second antenna arrangement 28 will be reduced. If the user has an expensive subscription for the cellular communication mode and therefore maximal cellular communication mode features, the radio communication mode will use the data for securing communications when transmitting a radio signal outside the cellular network. Additionally or alternatively, the transmission power of the second antenna arrangement will be maximised.

In another embodiment, the functionality of the radio communication mode is dependent upon a subscription for the radio communication mode. For example, if a users subscription to the radio communication mode has expired, they will be unable to activate the radio communication mode. Additionally, if there is a plurality of subscription types for the radio communication mode, the functionality of the radio communication mode will change according to the subscription type. For example, if the user has an inexpensive subscription for the radio communication mode, it will not use the data for securing communications when transmitting a radio signal outside the cellular network. Additionally or alternatively, the transmission power of the second antenna arrangement 28 will be reduced. If the user has an expensive subscription for the radio communication mode, it will use the data for securing communications when transmitting a radio signal outside the cellular network. Additionally or alternatively, the transmission power of the second antenna arrangement will be maximised.

Although embodiments of the present invention have been described in the preceding paragraphs with reference to various examples, it should be appreciated that modifications to the examples given can be made without departing from the spirit and scope of the invention. For example, the first transceiver 22, the first antenna arrangement 24, the second transceiver 26 and the second antenna arrangement 28 may be a single transceiver and a single antenna arrangement which are capable of functioning in the cellular communication mode and the radio communication mode.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a processor; and
   a memory including computer program code, where the memory and computer program code are configured, with the processor, to cause the apparatus at least to:
   i) when operating in a cellular communication mode, activate a radio communication mode of the apparatus, to select a radio communication frequency, to select an address associated with a second apparatus, to transmit a message via the cellular communication mode, the message being a short message service message that comprises the selected radio communication frequency for enabling a radio communication mode with a second apparatus; and
   ii) when operating in the radio communication mode, to communicate with the second apparatus on the selected radio communication frequency, and
   wherein the processor uses country identification data obtained from the cellular communication mode, to determine associated channel data from the data structure, and
   wherein if a channel of the cellular mode changes a plurality of times over a threshold plurality of times within a predetermined time a user of the apparatus is requested by the processor to input count identification data.

2. An apparatus as claimed in claim 1, wherein the radio communication mode of the apparatus is disabled until the user has provided the country identification data.

\* \* \* \* \*